(12) United States Patent
Lind

(10) Patent No.: US 8,359,917 B2
(45) Date of Patent: Jan. 29, 2013

(54) ARRANGEMENT WITH A NACELLE AND WITH AN INSTRUMENT

(75) Inventor: Soeren Oemann Lind, Næstved (DK)

(73) Assignee: Siemens Aktiengesellschaft, München (DE)

( * ) Notice: Subject to any disclaimer, the term of this patent is extended or adjusted under 35 U.S.C. 154(b) by 272 days.

(21) Appl. No.: 12/938,779

(22) Filed: Nov. 3, 2010

(65) Prior Publication Data
US 2011/0123320 A1 May 26, 2011

(30) Foreign Application Priority Data
Nov. 24, 2009 (EP) .................................... 09014634

(51) Int. Cl.
*G01W 1/00* (2006.01)
(52) U.S. Cl. ........................ 73/170.01; 416/61
(58) Field of Classification Search .......................... None
See application file for complete search history.

(56) References Cited

U.S. PATENT DOCUMENTS

| | | | | |
|---|---|---|---|---|
| 7,086,835 B2* | 8/2006 | Yoshida | ............................. | 416/9 |
| 7,244,100 B2* | 7/2007 | Yoshida | ............................. | 416/9 |
| 7,819,019 B2* | 10/2010 | Bisgaard | ......................... | 73/856 |
| 7,905,701 B2* | 3/2011 | Matsushita | ..................... | 415/4.3 |
| 8,006,552 B2* | 8/2011 | Matsushita | ................ | 73/170.24 |
| 8,246,304 B2* | 8/2012 | Egedal | .............................. | 416/61 |
| 8,262,354 B2* | 9/2012 | Hoffmann | ........................ | 416/61 |
| 2003/0156047 A1 | 8/2003 | Wobben | | |
| 2008/0192460 A1 | 8/2008 | Wobben | | |

FOREIGN PATENT DOCUMENTS

JP 2002279802 A 9/2002

* cited by examiner

*Primary Examiner* — Lisa Caputo
*Assistant Examiner* — Jermaine Jenkins

(57) ABSTRACT

An arrangement with a nacelle and with at least one instrument of a wind turbine is disclosed. The instrument is connected with a rod. A channel penetrates the wall of the nacelle. The channel interacts with the rod in a way that the rod and its assigned instrument are moved through the channel between a first and a second position. The instrument is positioned inside the nacelle at the first position for installation and/or service purposes, while the instrument is positioned outside the nacelle at the second position for operation purposes of the instrument.

10 Claims, 3 Drawing Sheets

ARRANGEMENT WITH A NACELLE AND WITH AN INSTRUMENT

CROSS REFERENCE TO RELATED APPLICATIONS

This application claims priority of European Patent Office application No. 09014634.1 EP filed Nov. 24, 2009, which is incorporated by reference herein in its entirety.

FIELD OF INVENTION

The invention relates to an arrangement with a nacelle of a wind turbine and with at least one instrument of a wind turbine.

BACKGROUND OF INVENTION

It is known to use an instrument bar to support instruments of a wind turbine. The bar is located on top of the nacelle and usually comprises wind wanes, anemometers, aviation light etc.

The instruments need to be maintained, serviced, changed or repaired during the life time of the wind turbine. Thus personal has to leave the nacelle for this purpose. This task is dangerous due to the height of the wind turbine. Sometimes it is even not possible to leave the nacelle due to the weather conditions and due to high wind speeds, etc.

The instrument bar needs to be placed on top of the nacelle at a planned site with a crane. Thus personal has to climb out of the nacelle to direct the crane and to fix the instrument bar at the nacelle. This task is dangerous, too.

FIG. 4 shows a picture of this kind of work, as it is done today. A bar B, which supports instruments INS is placed on top of a nacelle N.

SUMMARY OF INVENTION

It is the object of the present invention to provide an improved arrangement with the nacelle with at least one instrument, which allows a safe and reliable work of personal during the installation and for maintenance purposes.

This object is achieved by the features of the independent claims. Preferred configurations are object of the dependent claims.

According to the invention the arrangement contains a nacelle and at least one instrument of a wind turbine.

The instrument is connected with a rod. Preferably the instrument is arranged at the end of the rod.

A channel penetrates the wall of the nacelle. The channel interacts with the rod in a way that the rod and its assigned instrument are moved through the channel between a first and a second position. The instrument is positioned inside the nacelle at the first position for installation and service purposes, while the instrument is positioned outside the nacelle at the second position for operation purposes of the instrument.

According to the invention assembly-work, maintenance work and service-work of the instruments can be done from inside the nacelle very easily and without danger.

Furthermore there is no longer the need to use a crane for the installation of an instrument bar. The instruments are applied from the inside of the nacelle whenever they are needed and without the use of a crane.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
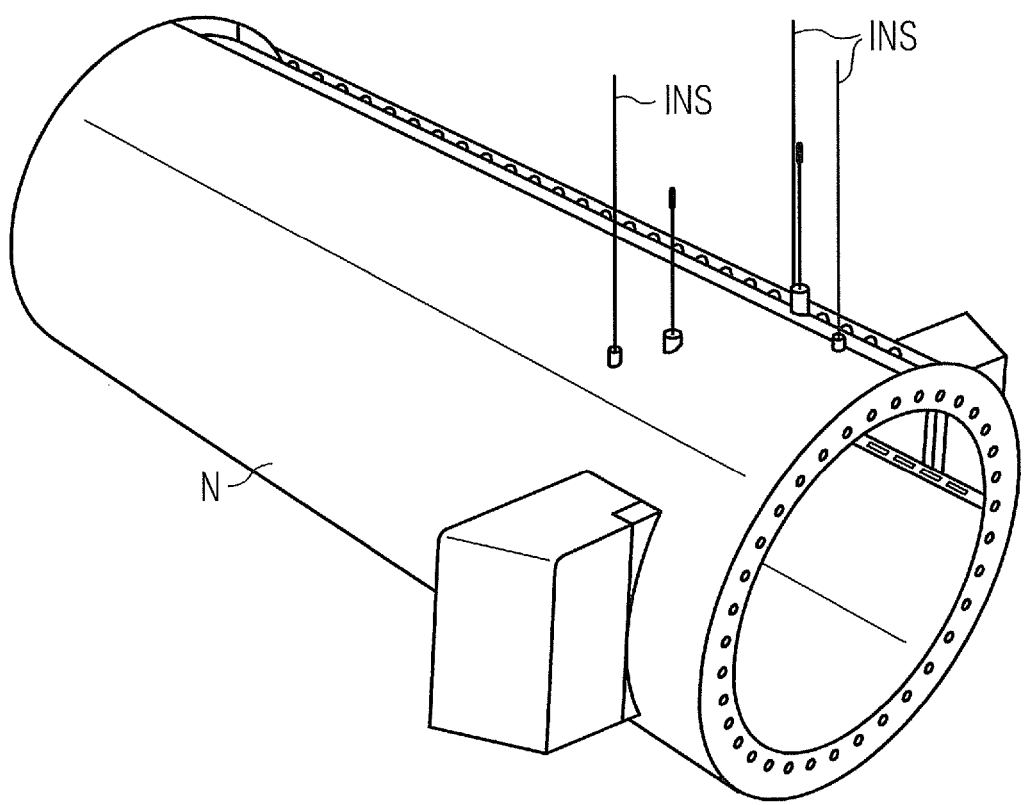
FIG. 1 shows the arrangement according to the invention.

FIG. 1 shows the arrangement according to the invention. On top of a nacelle N a number of instruments INS are positioned. They are located outside of the nacelle N. The instruments INS projects above the nacelle N.

The instruments INS may be used to measure environmental parameters or may be used for warning purposes or may be used as communication devices like antennas, etc. The instruments may comprise wind wanes, anemometers, aviation lights, etc.

Figure 2:
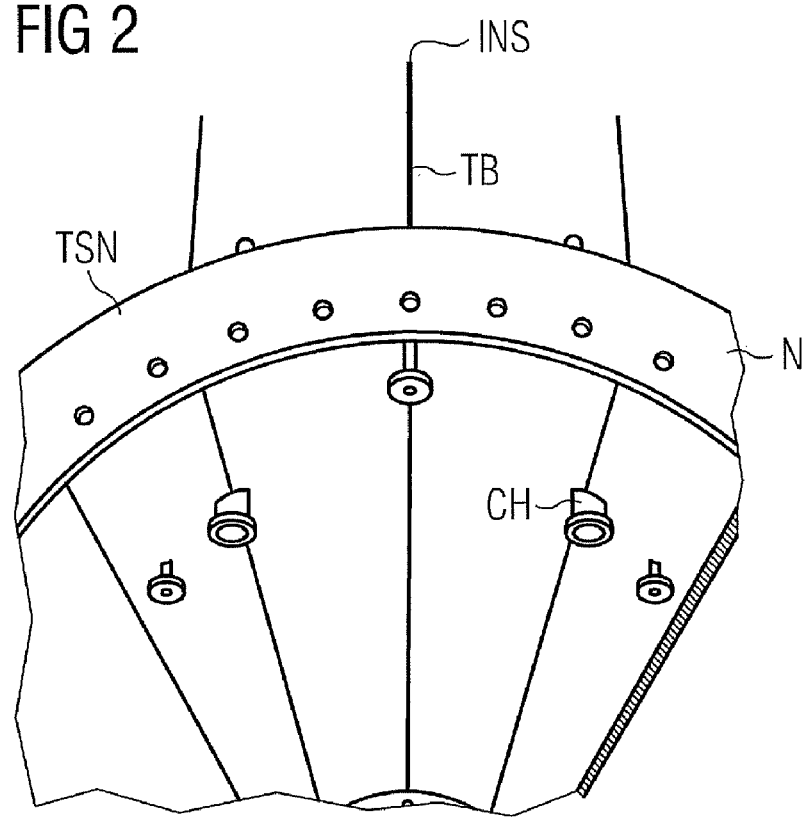
FIG. 2 shows details of the arrangement in reference to FIG. 1.

FIG. 2 shows details of the arrangement in reference to FIG. 1. This figure shows a view from the inner side of the nacelle N to the outer top side TSN of the nacelle N.

The instruments INS are mounted on a rod—in this example tubes TB are used for this purpose. The tubes TB are arranged into channels CH. The channels CH penetrate the top side TSN of the nacelle N for example.

It is also possible that the instruments are constructed to be an integrated part of the rod or of the tubes TB.

The channels CH show a larger diameter than the tubes TB, thus the tubes TB can glide inside the channels, together with the dedicated instrument INS.

Thus it is possible to bring the instruments into the nacelle N or to bring the instruments INS out from the nacelle N to the environment.

Figure 3:
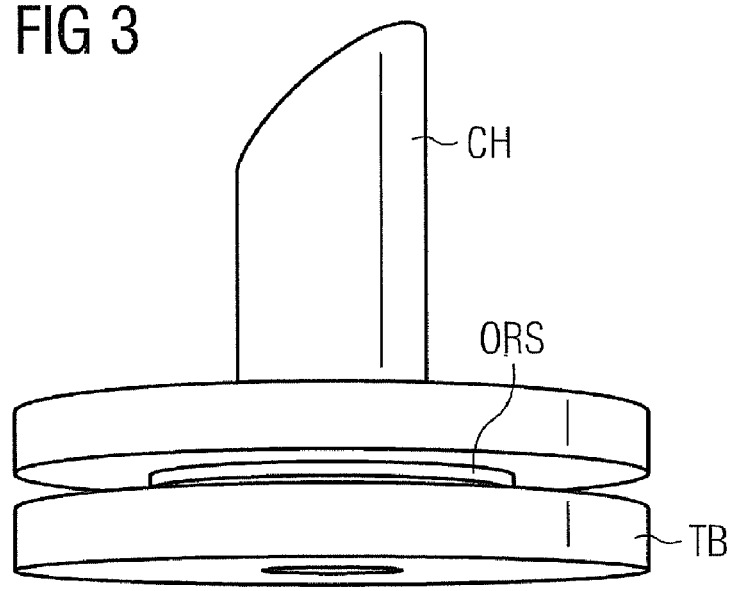
FIG. 3 shows details of the arrangement in reference to FIG. 1 and to FIG. 2.
Figure 4:
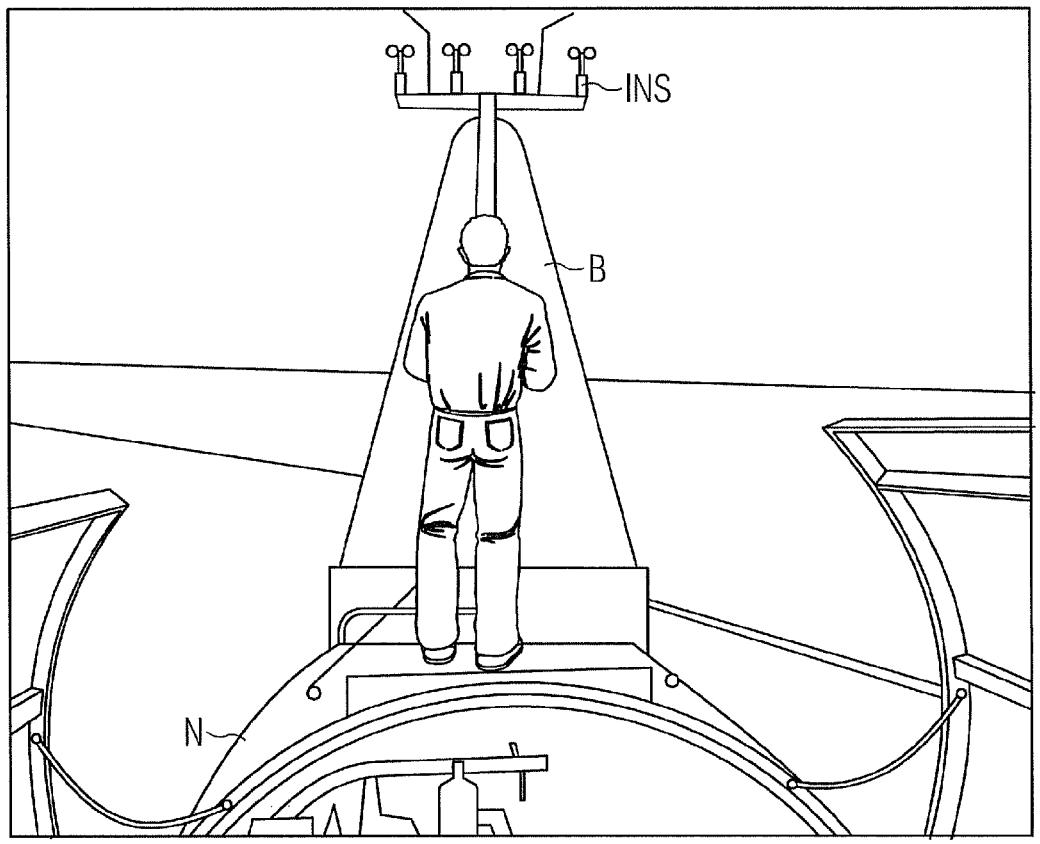
FIG. 4 shows the work-situation on top of a nacelle as described in the introduction of this application.

FIG. 3 shows details of the arrangement in reference to FIG. 1 and to FIG. 2 in a close up look from the inside of the nacelle N.

The channel CH penetrates the wall of the nacelle N. The channel CH shows an integrated flange, which is used to interact with an O-ring sealing ORS.

The tube TB also shows an integrated flange, which is used to interact with the O-ring sealing ORS, if the tube TB is by the most part inserted into the channel CH.

The invention claimed is:

1. Arrangement with a nacelle and with at least one instrument of a wind turbine,
    an instrument connected with a rod; and
    a nacelle comprising a channel which penetrates a wall of the nacelle, the channel interacts with the rod such that the rod and the connected instrument are moved through the channel between a first and a second position,
    wherein when the instrument is positioned inside the nacelle at the first position for installation and/or service purposes, and
    wherein the instrument is positioned outside the nacelle at the second position for operation purposes of the instrument.

2. The arrangement according to claim 1, wherein the wall penetrated by the channel is on top of the nacelle and the channel penetrates the top such that a longitudinal axis of the rod is vertical.

3. The arrangement according to claim 1, wherein the channel comprises a larger diameter then a diameter of the rod, thus the rod is guided inside the channel together with the connected instrument.

4. The arrangement according to claim 1, wherein the rod contains a telescope mechanism.

5. The arrangement according to claim 1, wherein the rod is hollow, and electrical wires are located and guided into the hollow rod.

6. The arrangement according to claim 1,
   wherein the channel contains an integrated flange, which is used to interact with an O-ring sealing, and
   wherein the rod contains an integrated flange, used to interact with the O-ring sealing for a substantially tight sealing against water, air or salt.

7. The arrangement according to claim 1, wherein the instrument is constructed to measure environmental parameters or where the instrument contains wind wanes, an anemometer or an aviation light.

8. The arrangement according to claim 1, wherein the instrument is includes wind wanes.

9. The arrangement according to claim 1, wherein the instrument is includes an anemometer.

10. The arrangement according to claim 1, wherein the instrument is includes an aviation light.

* * * * *